UNITED STATES PATENT OFFICE.

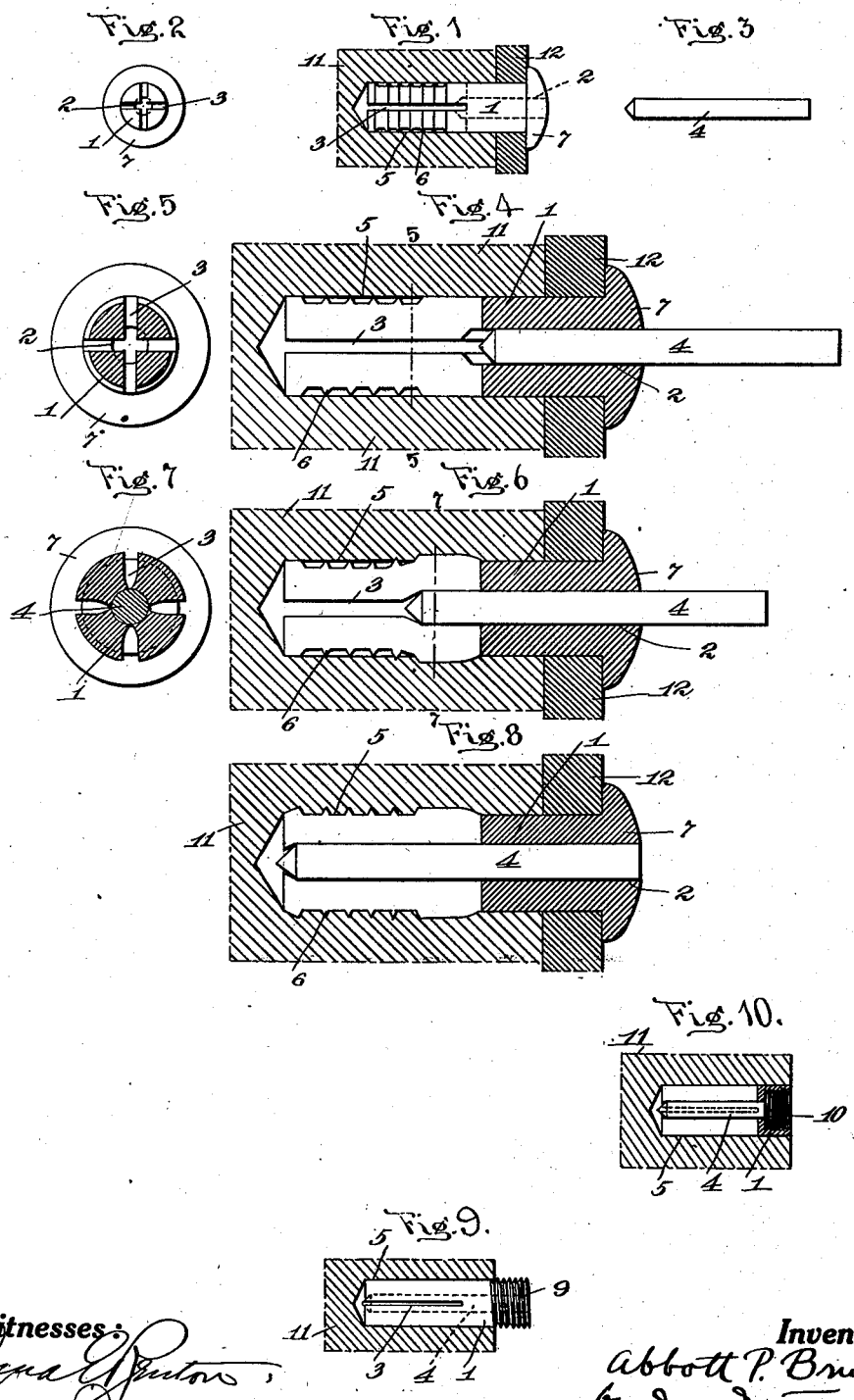

ABBOTT P. BRUSH, OF GREENWICH, CONNECTICUT.

EXPANSION-BOLT.

1,191,151.  Specification of Letters Patent.  Patented July 18, 1916.

Application filed December 6, 1913. Serial No. 804,967.

*To all whom it may concern:*

Be it known that I, ABBOTT P. BRUSH, a citizen of the United States, and a resident of the town of Greenwich, county of Fairfield, and State of Connecticut, have invented a certain new and useful Improvement in Expansion-Bolts, of which the following is a specification.

This invention relates to a device commonly known as an expansion bolt which is adapted to be inserted within a recess in a foundation and be expanded into contact with the walls of such recess.

The objects I have in view are to produce a bolt of this character which can be very cheaply manufactured, which can be easily inserted in place within a recess substantially of the same diameter of the bolt and which will make a very firm anchorage within the recess. These and further objects will more fully appear from the following specification and accompanying drawings, considered together or separately.

In the drawings: Figure 1 is a view of the body portion of one form of bolt embodying my invention when placed within a recess in a foundation. Fig. 2 is an end view thereof seen from the end of the body which is introduced within the work. Fig. 3 is a view of the pin. The pin, in combination with the body, constitutes the complete bolt. Fig. 4 is a view in section on a larger scale of the same kind of bolt illustrated in the preceding figures, showing it in unexpanded position. Fig. 5 is a sectional view on the line 5—5 thereof. Fig. 6 is similar to Fig. 4, but in partially expanded position. Fig. 7 is a section on the line 7—7 of Fig. 6. Fig. 8 is a view similar to Figs. 4 and 6, but with the bolt entirely expanded. Fig. 9 is a view of a modification of the bolt in expanded condition; and Fig. 10 is a similar view of another modification.

In all of the views, like parts are designated by the same reference characters.

As before stated, my improved bolt comprises a body and a pin. The body 1 is cylindrical in shape. It is provided with an opening 2 extending from one end inward. The length of this opening and the size thereof depend upon the size of the bolt. A plurality of slots 3 extend from the other end of the bolt inward. As shown in the views, I employ four of these slots, each extending from the periphery of the bolt to the center and from one end of the bolt to a point adjacent to the end of the opening 2 or beyond the end of the opening. The pin 4 is of the same diameter throughout. It is of such a size that it can enter the opening 2. It is of a length sufficient to extend through the embedded extremity of the body. This pin is adapted to be driven into the opening 2, and then beyond the opening so that its end reaches to the embedded end of the bolt. What happens when the pin is driven in, is graphically illustrated in Figs. 4, 6 and 8.

Fig. 4 shows the pin introduced to a point not quite at the base of the opening 2. Fig. 6 shows it driven in part way into the space at the base of the slots 3. The effect of this is to distort the slotted portion of the body outward into close engagement with the walls of the recess 5, in which the bolt lies. The inner edges of the portion of the body, at the intersection of the slots, are also distorted outward, as shown in Fig. 7, provided the recess 5 is sufficiently small so that that has to occur. Fig. 8 shows the pin driven all the way in. The effect of this is to expand the slotted portions of the body radially outward. This produces a circumferential contact, because the portions of the material of the body between the slots can be driven uniformly outward in a radial direction. It also produces a line contact with the walls of the recess, because the slotted portions of the body are driven outward from the base of the opening 2 up to and including the embedded end of the body.

If desired, the embedded portion of the bolt adjacent the slotted portions of the body may be circumferentially corrugated, as at 6. This is not essential, however, in all instances (see Figs. 9 and 10). The corrugations may be shallow, as in Figs. 1 to 8, or may be deep.

I prefer to have the opening 2 extend to a point beyond the inner ends of the slots 3, as shown in Figs. 1 and 4. This produces an overlap in the slotted portion of the opening. The effect of this is to cause a radial expansion of the slotted portion by the end of the pin close to the base of the opening 2. I also prefer to provide a pointed end on the pin, as shown, which will assist in the expanding operation. I also prefer to make the base of the opening 2 with inclined walls, as shown in Figs. 1 and 4, so that the resistance to the entrance of the pin is reduced and the tendency of radial expansion of the slotted portion of the body is increased.

The invention may be applied to any form of expansion bolt. That shown in Figs. 1 to 8 inclusive is a headed bolt having a head 7. This head serves to hold the attachment or work 12 into engagement with the foundation 11.

Fig. 9 illustrates a stub bolt. In this embodiment of the invention, the body projects from the foundation, and is provided with screw-threads 9.

Fig. 10 illustrates a socket bolt. In this embodiment of the invention, the body is entirely embedded in the foundation. It is provided with an internally threaded portion 10. When expanding this form of bolt, the pin is first driven in until its head projects but a slight distance from the face of the foundation. Then the pin is entirely seated by means of a punch.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:—

1. An expansion bolt having a body formed of a single piece of distortable material, said body having a shank and an enlarged head adapted to hold the work, said shank being of substantially the same diameter throughout and having a centrally located longitudinal opening extending from the head end of the body toward the point thereof, the shank having a slot extending from the point thereof toward the head, said slot meeting said opening and being of less width than the diameter of the opening, in combination with a pin of a diameter smaller than the opening but greater than the width of the slot so that when driven into the slot it will distort the material adjacent the slot to grip the pin at the point where it encounters the slot and permanently expand the material of that portion of the shank which is slotted.

2. An expansion bolt having a body formed of a single piece of distortable material, said body having a shank and an enlarged head adapted to hold the work, said shank being of substantially the same diameter throughout and having a centrally located longitudinal opening extending from the head end of the body toward the point thereof, said shank having two slots located at an angle to one another and made across the shank and intersecting at substantially the longitudinal axis of the same, said slots extending from the point of the shank toward the head, said slots meeting said opening, each being of less width than the diameter of the opening, in combination with a pin of a diameter smaller than the opening but greater than the width of a slot, so that when driven into the slots it will distort the material adjacent to the slots to grip the pin at the points where it encounters the slots and permanently expand the material of that portion of the shank which is slotted.

3. An expansion bolt having a body formed of a single piece of distortable material, said body having a shank and an enlarged head adapted to hold the work, said shank being of substantially the same diameter throughout a centrally located longitudinal opening extending from the head end of the body toward the point thereof, the shank having a slot extending from the point thereof toward the head, said slot meeting said opening and extending into the same, and being of less width than the diameter of the opening, in combination with a pin of a diameter smaller than the opening but greater than the width of the slot so that when driven into the slot it will distort the material adjacent to the slot to grip the pin for the length of the slot and permanently expand the material of that portion of the shank which is slotted.

This specification signed and witnessed this 28th day of November, 1913.

ABBOTT P. BRUSH.

Witnesses:
JAS. F. COLEMAN,
ANNA E. RENTON.